United States Patent

Hayashi et al.

[11] Patent Number: 5,864,670
[45] Date of Patent: *Jan. 26, 1999

[54] COMMUNICATION NETWORK SYSTEM IN WHICH AN UNREGISTERED TERMINAL BEING USED BY A PARTY CAN BE LOCATED FOR STARTING A SESSION

[75] Inventors: Toshimitsu Hayashi, Chigasaki; Kenjiro Mori, Sagamihara; Masami Kameda, Yokohama; Yoshiyuki Nakayama, Kawasaki; Takeshi Ishizaki, Sagamihara, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 529,057

[22] Filed: Sep. 15, 1995

[30] Foreign Application Priority Data

Sep. 26, 1994 [JP] Japan .................................... 6-229182

[51] Int. Cl.$^6$ .................................................... H04L 12/18
[52] U.S. Cl. ............................... 395/200.34; 395/200.57; 395/200.3; 370/260; 379/202
[58] Field of Search ................................ 395/200, 200.3, 395/200.34, 200.57; 370/13, 260; 379/201, 202

[56] References Cited

U.S. PATENT DOCUMENTS

| 5,239,577 | 8/1993 | Bates et al. ............................ 379/201 |
| 5,247,615 | 9/1993 | Mori et al. .......................... 395/200.04 |
| 5,261,052 | 11/1993 | Shimamoto et al. .............. 395/200.01 |
| 5,280,583 | 1/1994 | Nakayama et al. ................. 395/200.04 |
| 5,363,507 | 11/1994 | Nakayama et al. ...................... 395/800 |
| 5,408,608 | 4/1995 | Konodo et al. ....................... 395/200.1 |
| 5,548,578 | 8/1996 | Matsune et al. .......................... 370/13 |
| 5,586,254 | 12/1996 | Kondo et al. ........................ 395/200.5 |

FOREIGN PATENT DOCUMENTS

| 2-116955 | 5/1990 | Japan . |
| 5-53944 | 5/1993 | Japan . |

Primary Examiner—Christopher B. Shin
Attorney, Agent, or Firm—Antonelli, Terry, Stout & Kraus, LLP

[57] ABSTRACT

An object of the present invention is to offer a communication network system in which it is possible to connect a logical channel for performing information exchange or information communication between terminals connected to the communication network without inputting an address of a terminal to communicate with. In the communication network according to the present invention in which a logical channel is connected between desired terminals connected to the communication network to perform information exchange or information communication between the desired terminals, a connection controller for a network and communication is provided which specifies a terminal which can be used by a person to communicate with through the communication network by inputting information excluding the address of the terminal to which a connection request is issued to connect the logical channel to the specified terminal.

16 Claims, 10 Drawing Sheets

| USER'S NAME | TERMINAL NAME (ADDRESS) |
|---|---|
| yamamoto | host1 |
| tanaka | host2 |
| suzuki | host3 |
| saitoh | host4 |
| komatu | host5 |
| takasima | host6 |
| satoh | host7 |
| . . . | . . . |

FIG. 5

| TELEPHONE NO. | TERMINAL NAME (ADDRESS) |
|---|---|
| 012-3456 | hostA |
| 254-5874 | hostB1<br>hostB2<br>hostB3<br>hostB4 |
| 251-6859 | hostC1<br>hostC2<br>hostC3 |
| 245-6813 | hostD1 |
| . . . | . . . |

| POSITION | TERMINAL NAME (ADDRESS) |
|---|---|
| FIRST DEPT. | host11 |
|  | host12 |
|  | host13 |
|  | host14 |
|  | host21 |
| SECOND DEPT. | host22 |
|  | host23 |
| ... | ... |

| IDENTIFICATION NO. OF STAFF MEMBER | NAME | POSITION | TELEPHONE NO | USER'S ID |
|---|---|---|---|---|
| 123356 | YAMAMOTO | THIRD DEPT. | 831-1234 | yamamoto |
| 123567 | TANAKA | FIFTH DEPT. | 851-1234 | tanaka |
| 123657 | SUZUKI | SIXTH DEPT. | 861-1243 | suzuki |
| 123857 | SAITOH | INSPECTION SECT., INSPECTION DEPT. | 351-1243 | saitoh |
| 123068 | KOMATU | GENERAL AFFAIRS SECT., GENERAL AFFAIRS DEPT. | 361-4213 | komatu |
| 123059 | TAKASIMA | SERVICE SECT., GENERAL AFFAIRS DEPT. | 362-4132 | takasima |
| 123352 | SATOH | THIRD DEPT. | 832-1432 | satoh |
| ... | ... | ... | ... | ... |

COMMUNICATION NETWORK SYSTEM IN WHICH AN UNREGISTERED TERMINAL BEING USED BY A PARTY CAN BE LOCATED FOR STARTING A SESSION

BACKGROUND OF THE INVENTION AND RELATED ART

The present invention relates to a communication network system for making the connection of a logical channel for information exchange or information communication of characters, voices, images or file data between a plurality of terminals connected to the communication network.

Generally, in order to perform information exchange or information communication of characters, voices, images or file data between terminals connected to the communication network, it has been necessary to designate the name or address of a terminal which is able to specify the terminal being desired to be connected. There is a description of a method in which the other terminals are informed of an input terminal address in Japanese Patent Laid-Open No. Hei 2-116955.

In general, the name or address of a terminal which is usually used is known but in many case that of a terminal which is rarely used or used for the first time is not known. A user who does not use a terminal often may not know the name or address of a terminal which he uses. In the above-mentioned related art, a terminal which wants to transmit a connection request cannot be connected to another terminal which can be used or in use through the communication network unless the former knows the name or address of the latter.

OBJECTS AND SUMMARY OF THE INVENTION

An object of the present invention, for solving the above-mentioned subject, is to offer a communication network system in which a terminal which wants to transmit a connection request can be connected to another terminal which can be used or being used through the communication network system for information exchange or information communication between above-mentioned terminals even through the name or address of the latter terminal is not known to the side of the former terminal.

In the present invention, in the case of a connection controller for a network and communication which connects a logical channel between a terminal on the other end of the line which is wanted to connect in the communication network system and a terminal on this side, a user's name of the terminal on the other end of the line or information corresponding to the user's name is input in place of the address information of the terminal.

According to the present invention in the connection controller for a network and communication in the communication network system, specific information relating to a user's name, such as the telephone number or the place is input in place of the address information of the terminal to communicate with.

The present invention is a communication network system in which a logical channel is connected between desired terminals connected to the communication network to perform information exchange or information communication between the terminals, comprising: a memory unit provided in each of a plurality of desired terminals or a server connected to the communication network, for making and storing a selecting information beforehand which is able to select the address of a terminal having a large probability that a user is using the terminal from such data as the user's name or the information corresponding to the user's name, or the specific information relating to the user's name (the telephone number, the facsimile number, the place, the position, etc.) of a terminal desired to communicate with through the communication network system; an input portion provided in each of a plurality of desired terminals, for inputting the user's name, information corresponding to the user's name (the user's ID, the user's employee number, the user's name number, etc.), or specific information relating to the user's name of a terminal with which the exchange of information communication is desired by connecting a logical channel through the communication network; and a connection controller for a network and communication provided in each of a plurality of desired terminals, which selects the address of a terminal on the other end of the line having a probability that a person having the user's name to communicate with is using it from the user's name or the information corresponding to the user's name input in the input portion based on the selecting information stored in the memory unit, transmits a connection request to the address of the selected terminal through the communication network, investigates and confirms if the person having the user's name can use the terminal or the terminal is being used, specifies the terminal to communicate with which can be used or in use, and connects a logical channel to the specified terminal through the communication network.

The above-mentioned memory unit comprises a table showing the correspondence between the user's name or the information relating to the user's name and the terminal address based on a history of usage (including the frequency of usage) of a person having the user's name, as a selecting information.

A selecting information which can select a terminal having a large probability that a user is using the terminal is made from the user's name or the information corresponding to the user's name and specific information relating to the user's name of a terminal on the other end of the line which is desired to communicate with through the communication network, and stored beforehand in the memory unit to be provided in each of a plurality of terminals to be connected to the communication network.

In each of the memory units provided in the plurality of desired terminals in the communication network system, a table is provided showing the correspondence between the users' names or the information corresponding to the users' names and the terminal address based on a history of usage (including the frequency of usage) of a person having the user's name and also showing the correspondence between the telephone numbers, positions or places as specific information corresponding to the users' names and the terminal address located in the vicinity of the telephone numbers, positions or places, as a selecting information to be stored.

The present invention is a communication network system in which a logical channel is connected between desired terminals connected to the communication network for performing information exchange or information communication between the terminals, comprising in a plurality of desired terminals; a memory unit which makes and stores a selecting information beforehand which can select a terminal having a large probability that a user is using the terminal from the correspondence relation between the user's name or the information corresponding to the user's name and the specific information relating to the user's name, and the user's name or information corresponding to the user's name and the specific information relating to the user's name of a terminal with which it is desired to perform information communication through the communication network system; an input portion for inputting, at lease, either the user's name or the information corresponding to the user's name, or the specific information relating to the user's name of a terminal with which information communication is to be performed through the communication network; and a connection controller for a network and communication which retrieves, using either the user's name or the information corresponding to the user's name, or the specific information relating to the user's name input in the input portion, the other, selects a terminal having a large probability that a person of the user's name is using the terminal from the one party input in the input portion and the other party obtained by retrieval based on the selecting information stored in the memory unit, transmits a connection request through the communication network to the selected terminal, investigates if the person of the user's name can use the terminal or is using it, specifies the terminal which can be used or being used by the person of the user's name, and connects a logical channel to the specified terminal through the communication network.

In the connection controller for a network and communication in the communication network system, when a terminal being used is to be specified, in a case where a user is in a waiting state in activating an application software to be used for connection, a terminal in activating daemon is searched and specified.

The present invention is a communication network system in which a logical channel is connected between desired terminals connected to the communication network for performing information exchange or information communication between the terminals, comprising: a mail server for storing mail address translation data, connected to the communication network in correspondence to a terminal group composed of a plurality of terminals connected to the communication network; and a connection controller for a network and communication which transmits a mail address of a terminal which is desired to communicate with as the information to be a clue to find out a terminal having a large probability that a person desired to be connected to is using the terminal, to the mail server in inputting it through a terminal which desires to issue a connection request, specifies a mail server based on the mail address translation data stored in the mail server, selects a terminal having the probability that the terminal is being used by a person having the user's name at the other end of the line based on the selecting information stored in the specified mail server, transmits a connection request to the selected terminal through the communication network, investigates whether the person having the user's name can use the terminal or in use, specifies the terminal which can be used or being used, and connects a logical channel to the specified terminal through the communication network.

In the case of the constitution as described in the above, the history of usage data of a terminal which has been used by a person at the other end of the line (correspondence data (correspondence table) between a user's name and the address of a terminal which has been usually used by a person of the user's name) or the history of usage data of a telephone number, etc. which has been used by a person at the other end of the line (user of a terminal) and the address of a nearby terminal are input beforehand to an external storage device of a predetermined terminal or a memory unit provided in the server from respective terminals to make a data base, so that based on the data base the number of terminals is selected to a certain number and a terminal can be specified by the investigation in displaying on a display screen whether a user of a selected terminal is in a usable state of the terminal or not.

As described in the above, according to the present invention, even if a user does not know the name or address of a terminal which is desired to be connected, the user's terminal can be connected to a terminal at the other end of the line by transmitting a connection request, and information exchange or information communication can be performed between the terminals.

DESCRIPTION OF THE PREFERRED EMBODIMENTS

A communication network system, in which a plurality of terminals are connected to the system and a logical channel can be connected between terminals to perform information exchange or information communication concerning the information such as character information, audio information, image information, or file data information between the above-mentioned terminals, will be explained concretely based on the accompanying drawings.

At first, an example of a communication network system will be shown in which a user can be connected to a terminal being used by a person to talk with. In this place, a personal computer (PC) will be taken up as a terminal. It will be clearly understood that a work station can be also taken up as a terminal.

Figure 1:
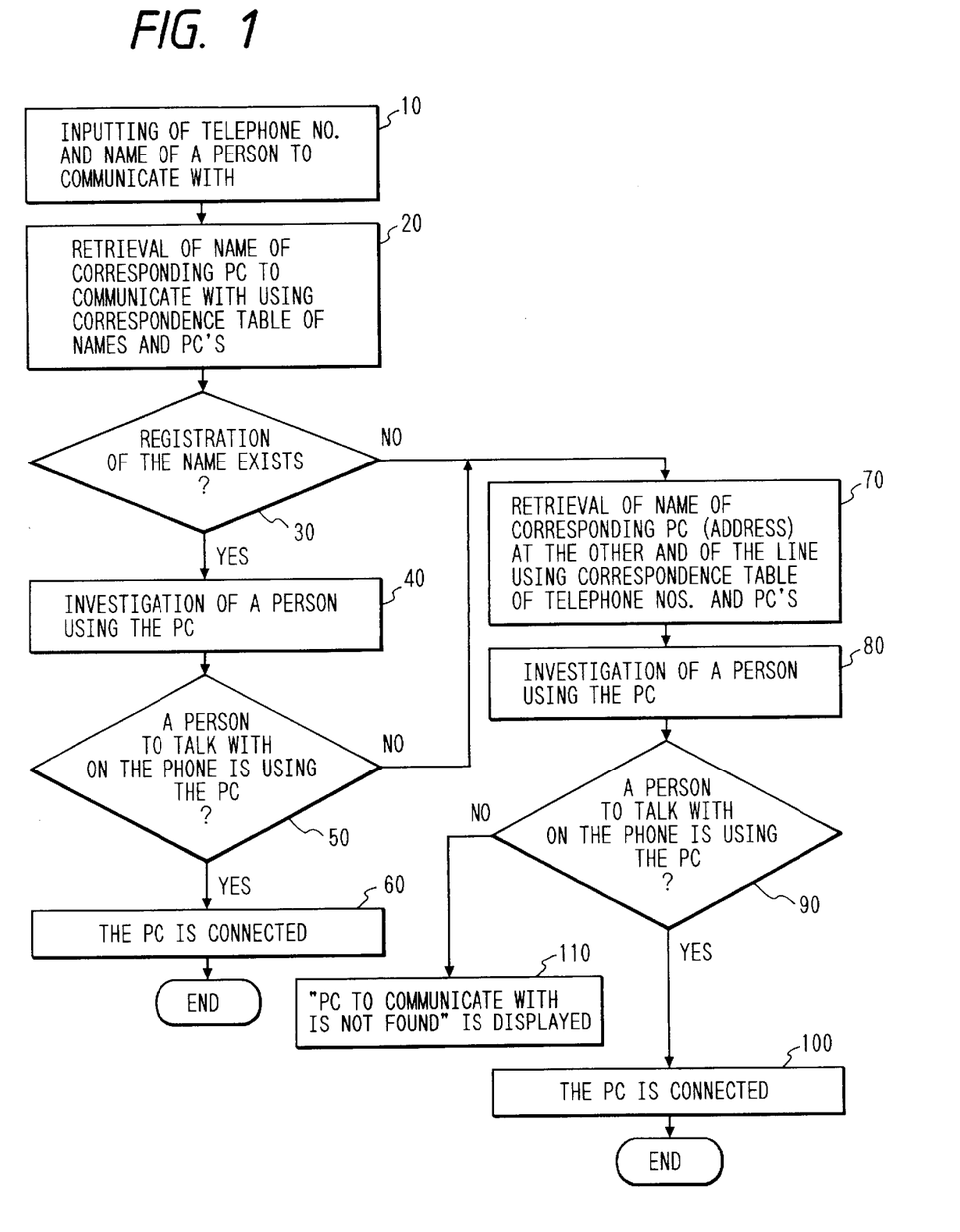
FIG. 1 is a flowchart showing the processing procedure for specifying the address of a PC (personal computer) in a communication network system.
Figure 2:
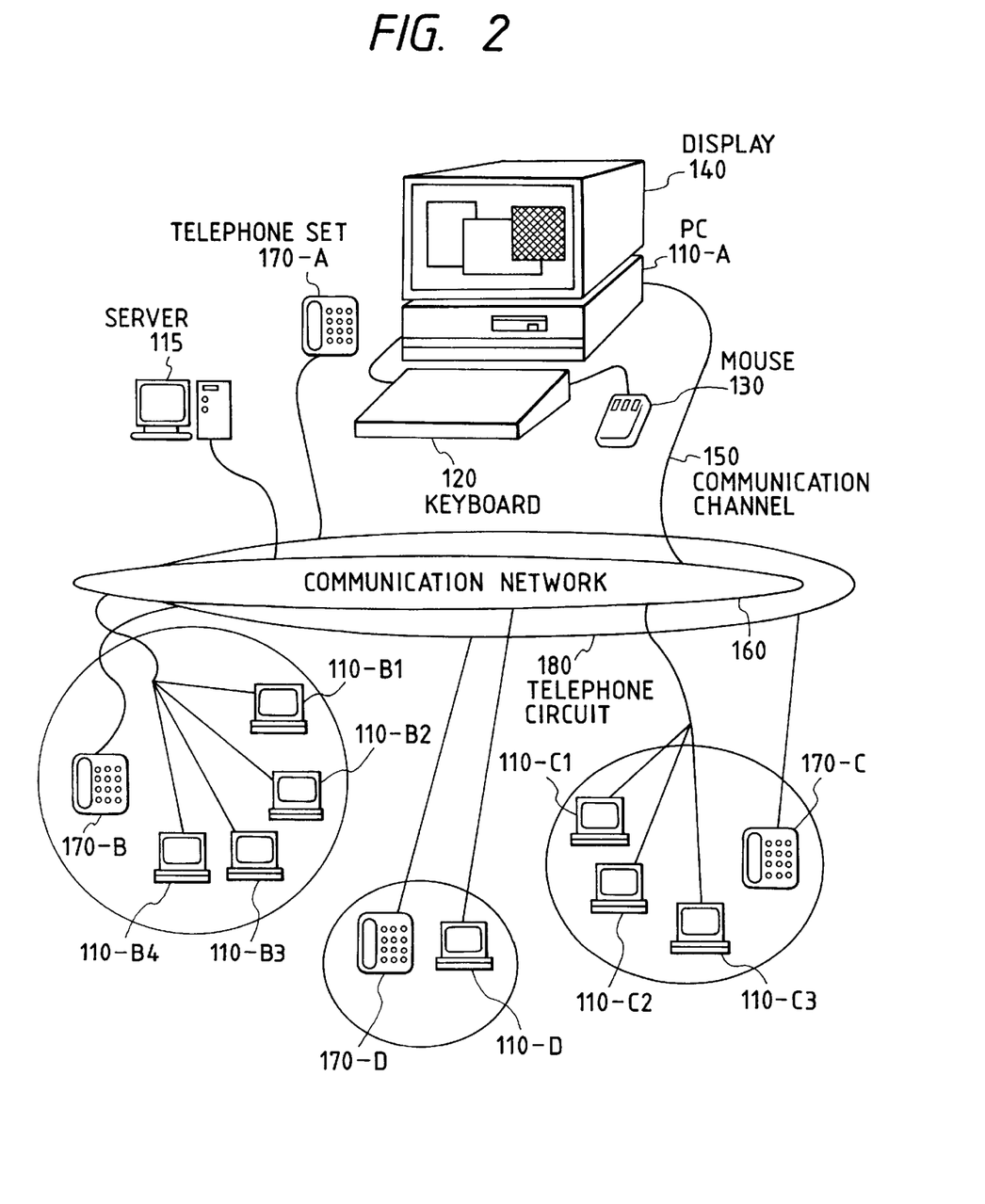
FIG. 2 is a diagram showing the whole constitution of a communication network system.
Figure 3:
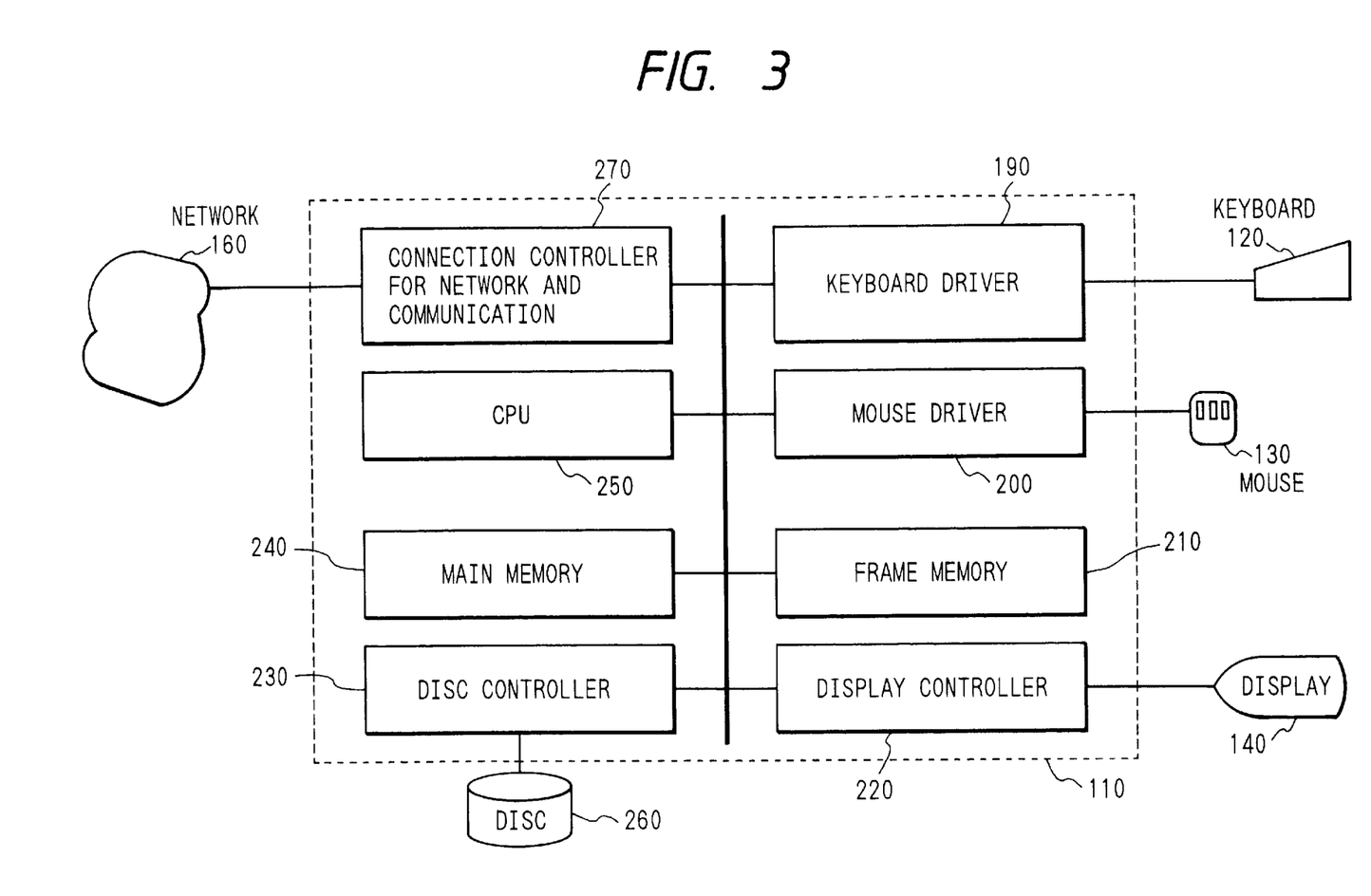
FIG. 3 is a diagram showing the constitution of a PC which constitutes each terminal.

FIG. 1 is a flowchart explaining the processing procedure till the name (address) of a PC is specified, FIG. 2 is a diagram showing the whole constitution of a communication network system, and FIG. 3 is a diagram showing the internal constitution of a PC shown in FIG. 2.

As shown in FIG. 2, a keyboard 120, a mouse 130 and a display 140 as input devices are connected to each of PC's, 110-A, 110-B1 to 110-B4, 110-C1 to 110-C3, and 110-D. These PC's are connected to a communication network 160 through a communication channel 150. A LAN (Local Area Network) or a WAN (Wide Area Network) can be considered as the communication network 160.

It is assumed that there is a telephone set 170 close to each of these PC's 110 and each telephone set is connected to a telephone line 180. For example, a telephone set 170-C is located in the vicinity of each of the PC 110-C1 to PC 110-C3. The telephone set 170 may be connected to the PC 110. In a case where the telephone set 170 is connected to the PC 110, it may be also good to call a person up from the PC 110 or to arrange to be able to find out the telephone number of a person at the other end of the line from the PC 110.

FIG. 3 is a diagram showing the internal constitution of each PC 110. The input from the keyboard 120 is analyzed by a keyboard driver 190 and sent to a CPU 250, and the input from the mouse 130 is analyzed by a mouse driver 200 and sent to the CPU 250. The CPU 250 executes a program stored in a main memory 240, and reads and writes the data (an application program and correspondence tables shown in FIG. 4 and FIG. 5 to be concretely described later) stored in a disc (external storage device) 260 through a disc controller 230. The processing result of the program is written in a frame memory 210. A display controller 220 reads the contents of the frame memory 210 at regular intervals and displays them on the display 140.

Figure 4:
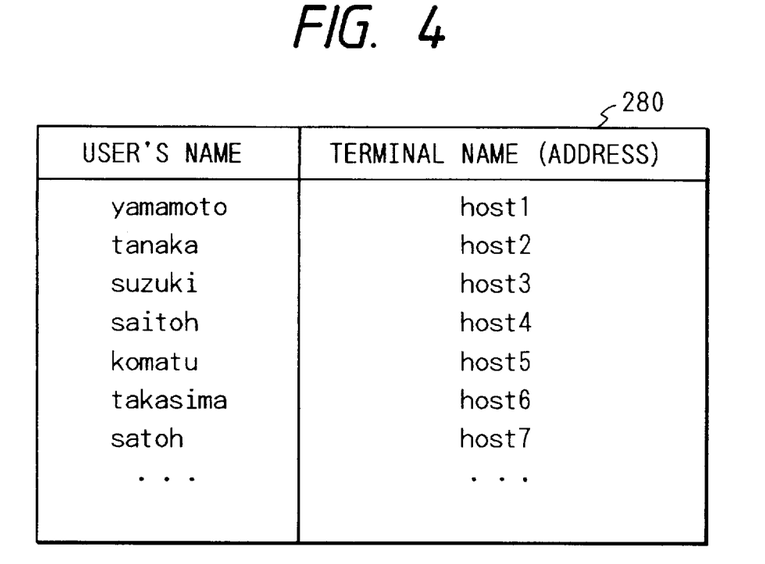
FIG. 4 is a diagram showing a history of usage data pressing the correspondence between users' names and terminal names (addresses) which are stored in each terminal (PC) or server beforehand.
Figure 5:
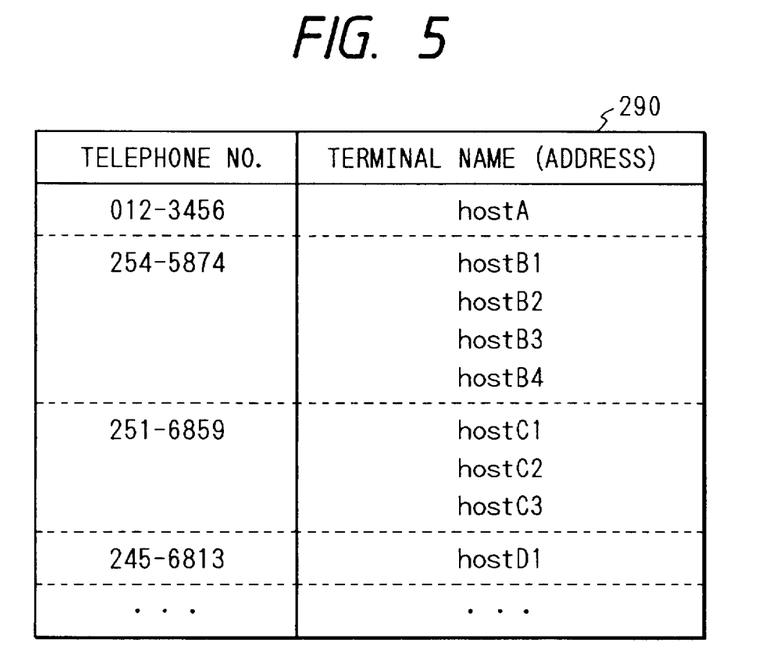
FIG. 5 is a diagram showing a history of usage data expressing the correspondence between telephone numbers and the names of nearby terminals which are stored in each terminal (PC) or server beforehand.

In a case where PC's 110-A, 110-B1 to 110-B4, 110-C1 to 110-C3, and 110-D are newly set and connected to the communication network 160 through the communication channel 150, when a user's name or a telephone number is changed, in respective PC's or in some specific PC's, the data in the correspondence tables shown in FIG. 4 and FIG. 5 are input from an input portion such as a keyboard, and the CPU needs to distribute the input data in the correspondence tables to its external storage device (disc) 260 and also to respective PC's 110-A, 110-B1 to 110-B4, 110-C1 to 110-C3, and 110-D through a connection controller for a network and communication 270 and the communication network 160, and to store the data in the external storage device (disc) 260 of each of the PC's beforehand as a correspondence table. In a case of a communication network system where a server 115 is connected to the communication network 160, it is good that the data in the correspondence tables shown in FIG. 4 and FIG. 5 input from the input portion of respective PC's or some specific PC's are stored in a memory unit such as a disc provided in the server 115 through a communication network (bus), and the server 115, when the occasion demands, distributes the data to respective PC's 110-A, 110-B1 to 110-B4, 110-C1 to 110-C3 and 110-D through a communication network (bus) and the data are stored in the external storage device (disc) 260 in each of the above-mentioned PC's as a correspondence table. In particular it is necessary that the updated data in the correspondence table are always stored in the memory unit such as a disc in the server 115. Thereby respective PC's 110-A, 110-B1 to 110-B4, 110-C1 to 110-C3, and 110-D, can see the data at the server 115 when the occasion demands, and the management of the data in the correspondence table is simplified. An arrangement is also good in which the data in the correspondence tables shown in FIG. 4 and FIG. 5 are stored beforehand in the memory unit such as a disc of the server 115, and every time a predetermined PC 110-A wants to be connected to a PC, the PC 110-A takes in the data in the correspondence table stored in the memory unit of the server 115 into its own main memory or frame memory and specify the address of the PC to be connected.

In the following, a case where the data in the correspondence tables shown in FIG. 4 and FIG. 5 are stored in the external storage device (disc) of each of the PC's beforehand will be explained.

A case where a terminal which issues a connection request, for example, the PC 110-A is connected to another terminal (another terminal with which information exchange or information communication including electronic conversation concerning character information, audio information, image information, file data, etc. are desired to be performed) will be explained.

In a case where the PC 110-A located in the vicinity of the telephone set 170-A is to be connected to a PC communicating with the telephone set 170-A, in the PC to be connected it is necessary to make the CPU 250 execute the application software for connection (stored in the external storage device 260). The meaning of "to connect" is to establish a logical channel so that the PC 110-A is able to perform information exchange with a terminal on the other end of a line through the communication network 160 using an application program in the external storage device 260 of each PC (The same shall apply hereinafter.). It is also possible that a terminal to be called makes the CPU 250 execute the application program when a connection request arrives at the connection controller for a network and communication 270 through the communication network 160, and in this case there is no need to activate the application software manually before both terminals are connected to each other.

A terminal on the side of issuing a connection request (PC 110-A) inputs an activation instruction from an input portion such a keyboard 120, a mouse 130, etc. and the CPU 250 activates connecting application software stored in the external storage device 260, and asks a user to input the telephone number (telephone number shown in FIG. 5) and the name of a person (user's name shown in FIG. 4) to communicate with in the above-mentioned input portion (step 10), and the telephone number and the name of the person to communicate with are displayed on the display 140 through the frame memory 210 and the display controller 220.

In a case where the telephone set 170-A is connected to the PC 110-A, it is also good to arrange the telephone number of a person to communicate with can be automatically input by calling the person using the telephone set 170-A.

Next in the PC 110-A, the CPU 250 investigates the name (address) of a PC which is usually used by a person, using the correspondence table shown in FIG. 4 (a history of usage including the frequency of usage is stored) stored in the external storage device 260 of the user's name and PC's based on the user's name input in the input portion (step 20), and displays the result of investigation, the name of the PC (address), on the display 140 through the frame memory 210 and the display controller 220.

In other words, in the PC 110-A, the CPU 250 detects a PC having a large probability that a person on the other end of a line is using with the use of the above-mentioned correspondence table stored in the external storage device 260 and displays the name of the detected PC (address) on the display 140.

In the PC 110-A, when the name of a person is not registered, the CPU 250 puts forward the process to step 70 (step 30). When the name of a person is registered, the CPU inquires of a PC to communicate with about a connection request through the connection controller for a network and communication 270 and the communication network 160 and investigates the information whether the PC is in a connectable state (a state where application software is activated) or not, and the information input from an input portion of a PC to communicate with and stored in the external storage device 260 or the main memory 240, that is, the CPU investigates the information telling who is using a terminal which is desired to be connected (step 40), and the information telling that a person on the other end of a telephone line (a user of the PC) is using the terminal is sent from the PC which is desired to be connected to the connection controller for a network and communication 270 through the communication network 160 as a confirmed answer (step 50). As described in the above, based on the confirmed answer from the PC to communicate with whose registration is found, the CPU 250 in the PC 110-A issues a connection OK request to the PC to communicate with through the connection controller for a network and communication 270 and the communication network 160 to be connected to the PC to communicate with (step 60).

Even in a case where more than one PC are found in the correspondence table used in step 20, there is no problem for the connection to a user of the PC after confirmation.

The process for investigating a user of a PC to communicate with will be explained in detail based on FIG. 6. In a case where a confirmed answer telling that a person at the other end of the telephone line is not using a PC is transmitted from the PC to communicate with to the connection controller for a network and communication 270 in the PC 110-A through the communication network 160, the CPU 250 in the PC 110-A retrieves the name (address) of a PC located close to the telephone set having the input telephone number referring to a telephone-terminal correspondence table shown in FIG. 5 stored in the external storage device 260 (step 70). In other words, when the CPU 250 in the PC 110-A retrieves the name (address) of a PC with the telephone number of the telephone set 170-B, for example PC's 110-B1 to 110-B4 are selected. The CPU 250 in the PC 110-A finds a PC to communicate with in the result of the retrieval, and inquires of the external storage device 260 or the main memory 240 about the PC through the connection controller for a network and communication 270 and the communication network 160 to investigate a user of the PC stored in the external storage device or the main memory (step 80), and when a person to communicate with is found (step 90), a confirmed answer telling that a person to communicate with is found is transmitted through the communication network 160 from a PC to communicate with to the CPU 250, and based on the confirmed answer, the CPU 250 in the PC 110-A is connected to the PC to communicate with through the communication network 160 (step 100). When a person to communicate with is not found, a confirmed answer telling that a person to communicate with is not found is transmitted from the PC to communicate with to the CPU 250 in the PC 110-A, and based on the confirmed answer, the CPU 250 stores the contents of information telling "a PC to communicate with is not found" in the frame memory 210, and the contents of the information are displayed on the screen of the display 140 (step 110) by the display controller 220.

Next, the processes in steps 40 to 60 and in steps 80 to 100 will be explained more in detail.

Figure 6:
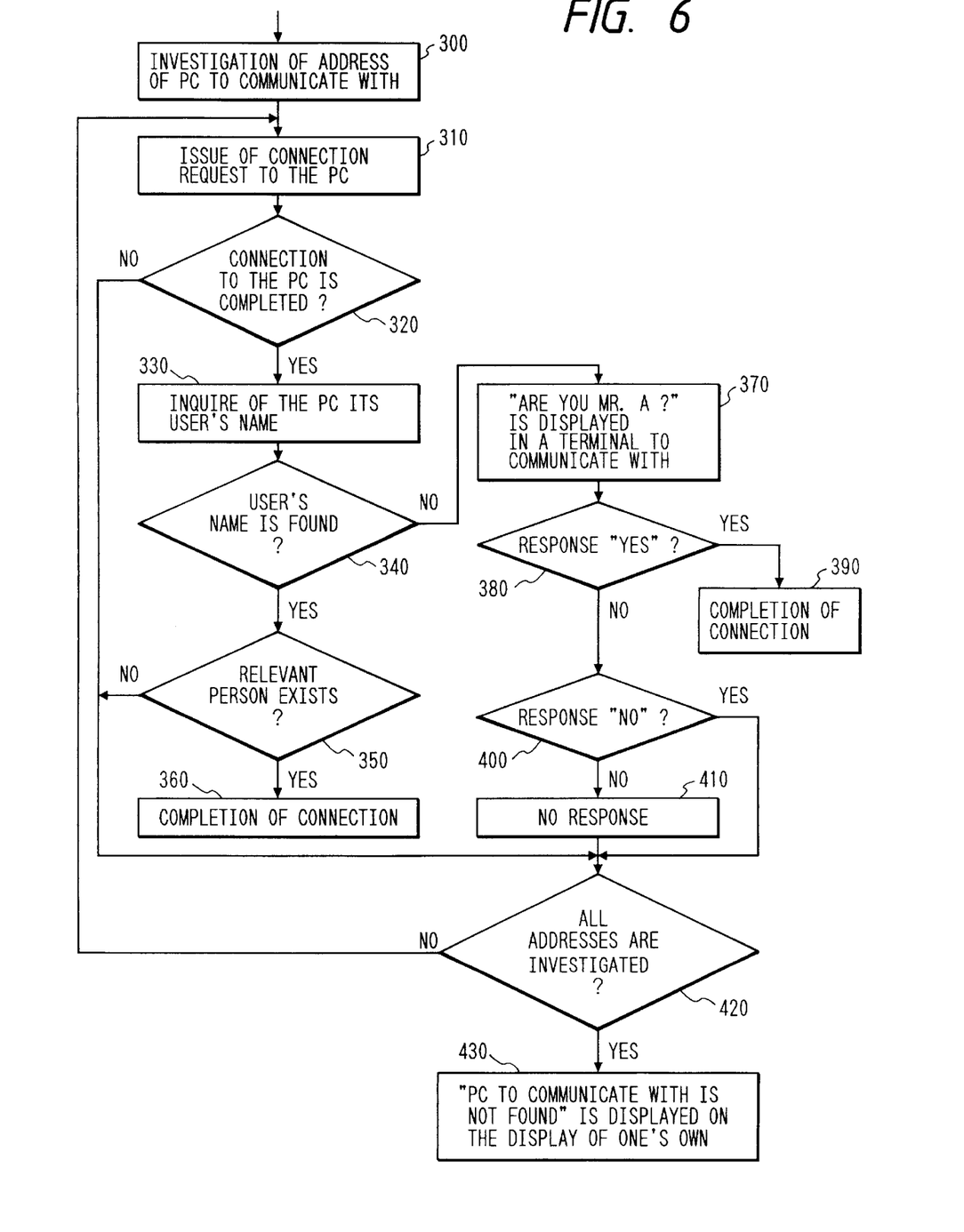
FIG. 6 is a flowchart concretely showing the processing procedure for specifying a PC which is being used by a person on the other end of a line out of PC's narrowed down to a certain number in the flowchart shown in FIG. 1.

FIG. 6 is a flowchart showing the procedure of a user confirming process for confirming whether a user who is using the PC is a person to communicate with over the telephone or not in investigating the address of the PC. At first, the CPU 250 in the PC 110-A investigates the address of a PC (terminal name) to communicate with from a user's name input in the input portion based on the user-terminal correspondence table shown in FIG. 4 registered in the external storage device (disc) 260 (step 300). A plurality of addresses of PC's may exist in the correspondence table. In that case, the same process will be repeated until a proper user's name is found. Next, the CPU 250 in the PC 110-A issues a connection request to the PC to communicate with through the connection controller for a network and communication 270 and the communication network 160 (step 310). If the PC is not connected, that is, if there is no response, as described previously, the CPU 250 in the PC 110-A investigates the next candidate of a PC from the user's name and his telephone number referring to the user-terminal correspondence table shown in FIG. 4 and the telephone-terminal correspondence table shown in FIG. 5 each registered in the external storage device (disc) 260 (step 320). When a person talking on the phone is informed that a PC is going to be connected, application software in the PC is activated to be in a waiting state for connection or the PC is to be in a waiting state for connection from the beginning. Therefore, the fact that the PC does not respond to a connection request through the communication network 160 may be considered that a person to communicate with is not using the PC. Next, the CPU 250 inquires about a person's name who is using the PC (step 330). Then the user's name is found (step 340), and if a person on the other end of the telephone line is using the PC (step 350), the CPU 250 in the PC 110-A issues a connection OK request to the PC to communicate with through the connection controller for a network and communication 270 and the communication network 160 to be connected to the PC to communicate with based on a confirmed answer, and a user is informed of the completion of connection by displaying it on a display screen, and the connecting process is completed (step 360). In step 350, if the person at the other end of a telephone line is not using the PC, the CPU 250 in the 110-A investigate the next PC to communicate with referring to the user-terminal correspondence table shown in FIG. 4 and the telephone-terminal correspondence table shown in FIG. 5 each registered in the external storage device (disc) 260. In step 340, if the user's name is not found on the side of the PC 110-A, the PC 110-A issues an instruction to the PC to communicate with through the communication network 160, and the CPU 250 of the PC to communicate with stores the contents telling "Are you Mr. A?" in the frame memory 210 based on the instruction input from the connection controller for a network and communication 270, and the contents "Are you Mr. A?" are displayed on the display 140 being controlled by the display controller 220 (step 370).

In the PC to communicate with, for example, an icon "yes" displayed in the display 140 is input through a mouse driver 200 by designating the icon with a mouse 130, or it is directly input with a keyboard 120, and when a confirmed answer "yes" is given to the PC 110-A by the CPU 250 through the connection controller for a network and communication 270 and the communication network 160 (step 380), the CPU in the PC 110-A, based on the confirmed answer, issues a connection OK request to the PC to communicate with through the connection controller for a network and communication 270 and the communication network 160 for the connection to the PC to communicate with, and informs a user that the connection is completed by displaying it in the display 140, and the connection is completed (step 390).

When there is a response "no" from the PC to communicate with to the PC 110-A (step 400) or there is no response (step 410), the CPU 250 in the PC 110-A investigates the next PC referring to the correspondence tables stored in the external storage device 260. Five to ten seconds are long enough for the latency for the response in this case because a person on the other end of the line can be expected to be watching the PC.

In step 300, the CPU 250 in the PC 110-A investigates every thing about the corresponding PC's referring to the correspondence tables stored in the external storage device 260, and inquires of the PC to communicate with and if a PC which a person at the other end of the telephone line is using is not found, the CPU 250 stores the contents telling "The connection to the PC to communicate with was a failure." in the frame memory 210 and displays that "The connection to the PC to communicate with was a failure." on the display 140 by the display controller (step 430).

As described in the above, even though a user does not know the address of a PC which a person to communicate with is using, it is possible to connect a channel to the PC by giving information about the person (user's name and user's telephone number) or information about a history of usage of the PC by the person (including the using state of the PC).

In the above explanation the PC 110-A was taken as an example of a PC to issue a connection request, it will be clearly understood that in a case where any other PC issues a connection request the process can be executed with the same procedure.

Next, another communication network system according to the present invention will be explained based on FIG. 7.

Figure 7:
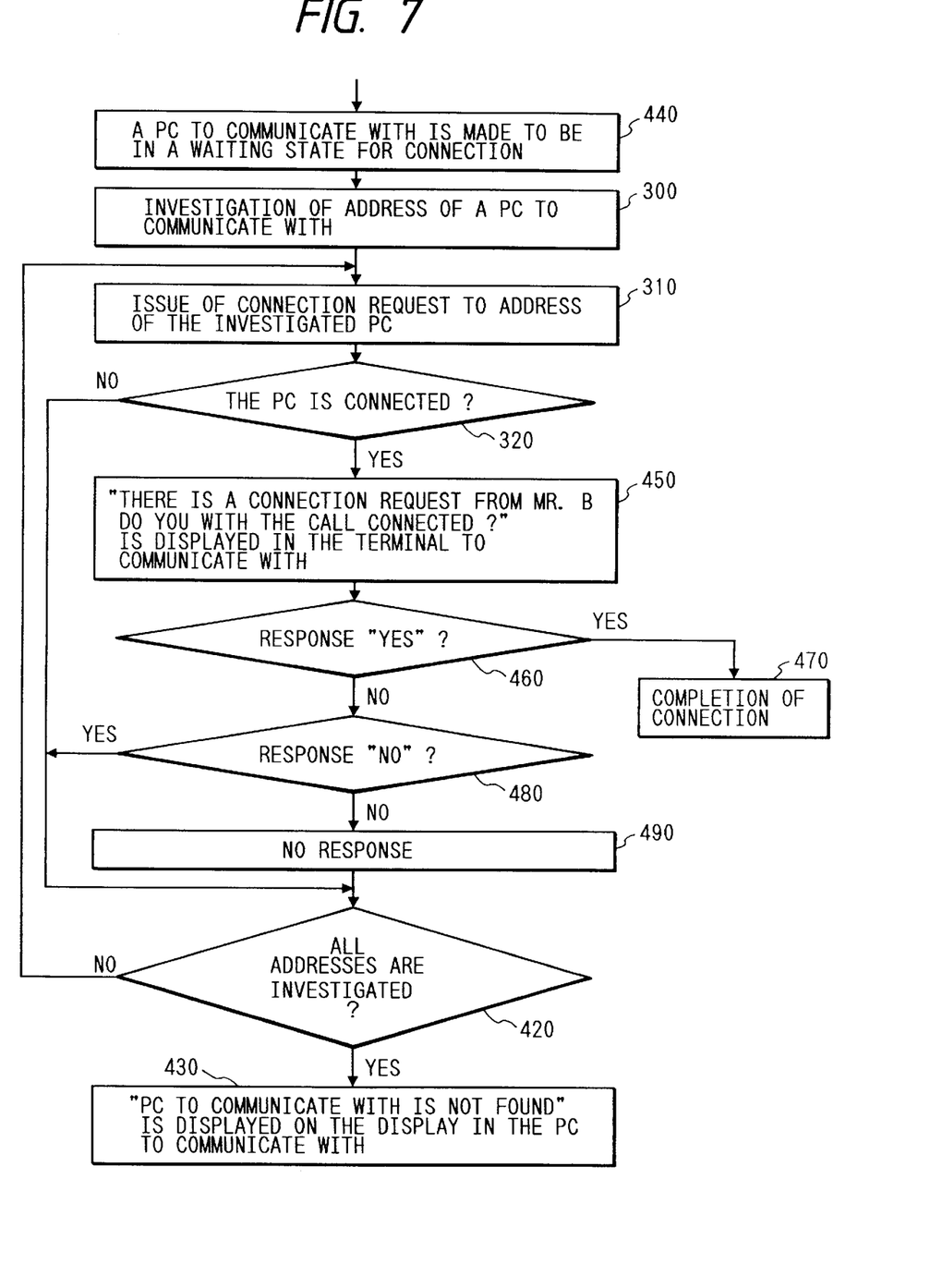
FIG. 7 is a flowchart concretely showing the processing procedure for specifying a PC which is being used by a person on the other end of a line without inputting the name of the PC out of PC's narrowed down to a certain number in the flowchart shown in FIG. 1.

FIG. 7 is a diagram showing a process in a case where a PC to communicate with is connected without inputting the name of a person to talk with. In such a process at first, a PC having a large probability that a person to communicate with is using is selected by the same procedure as that shown in FIG. 1, and the address of the PC is investigated (received) based on correspondence tables stored in the external storage device of a PC on this side. The procedure thereafter will be explained.

At first, a PC to communicate with is made to be in a waiting state for a connection request (application software is activated in the PC) (step 440). In other words, the PC to communicate with is not made to be in a waiting state for a connection request from the beginning, but when a user wants the PC to be connected he makes the PC in a waiting state for connection request manually.

For example, the PC 110-A issues a connection request to a PC to communicate with through the communication network 160 based on the result of investigation on the address of the PC to communicate with, and on receiving a response from the PC to communicate with, the PC 110-A issues a connection request to the PC to communicate with to connect the channel to the PC to communicate with (steps 300 to 320). This is the same procedure as that shown in FIG. 6. The PC to communicate with is not made in a waiting state for a connection request from the beginning, so that when there is a PC which is connected to the PC on this side, the PC at the other end of the line can be considered to be the one which is being used by a person to communicate with. Therefore the connection should be completed as it is. However, there is some probability that another PC is in a waiting state for connection request by chance. Therefore for confirmation a message such as "There is a connection request from Mr. B. Do you wish to be connected?" may be displayed on the display 140 in the PC to communicate with (step 450).

When a response "yes" is given from the PC to communicate with, the PC 110-A issues a connection request to the PC to communicate with to complete the connection (steps 460 and 470).

On the other hand, when a response "no" is given from the PC to communicate with (step 480) or no response is given (step 490), the same procedure as that shown in FIG. 6 will be taken. In other words, in step 420, the CPU 250 in the PC 110-A investigates every thing about corresponding PC's referring to correspondence tables stored in the external storage device 260 and inquires of the PC to communicate with, and when a PC which is being used by a person at the other end of a telephone line is not found, the CPU 250 stores the contents telling that "The connection to the PC to communicate with was a failure." in the frame memory 210 and displays that "The connection to the PC to communicate with was a failure." on the display 140 through the display controller 220 (step 430).

As described in the above, in a PC to communicate with, it is possible to specify the PC which a person to talk with is using without inputting the user's name.

Figure 8:
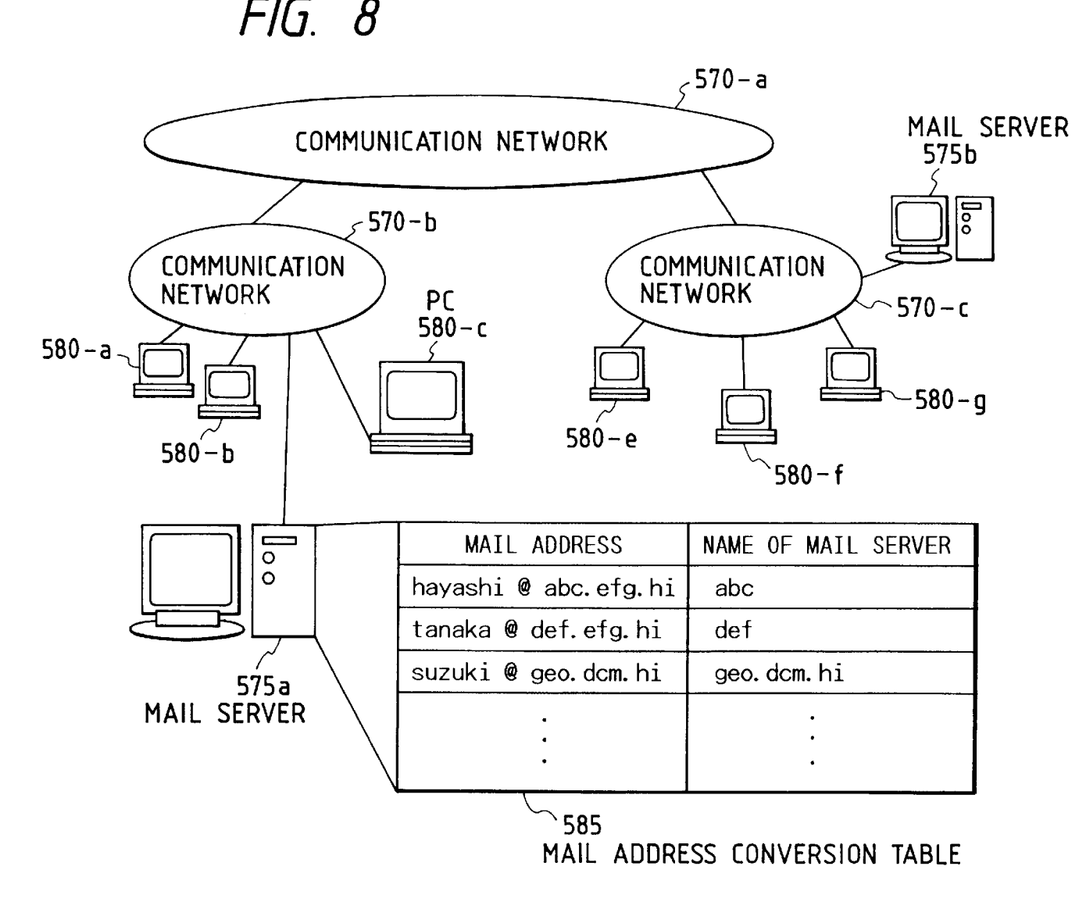
FIG. 8 is a diagram showing an example of the whole constitution of a communication network system.

Next, a case where a PC is to be connected to a person whose mail address is known will be explained. FIG. 8 is a diagram showing another communication network system according to the present invention provided with a mail server for connecting a PC or a work station to a person whose mail address is known.

FIG. 8 shows an example of the constitution of another communication network system having a male server 575a in which a plurality of PC's or work stations 580-a, 580-b, 580-c are connected with a communication network 570-b through respective communication channels, another male server 575b in which a plurality of PC's or work stations 580-e, 580-f, 580-g are connected with a communication network 570-c through respective communication channels, and a communication network 570-a connected with the networks 570-b and 570-c.

Explanation will be given assuming that a user is using the PC 580-c.

At first from the mail address of a person to communicate with, the name of a machine (address) of a mail server which is being used by the person to communicate with is investigated using a mail address translation table 585 stored in the memory unit of the mail server 575a. Next, the PC 580-c is connected to the mail server 575b on the side of the person to communicate with to investigate a terminal (PC) which reads a mail from another terminal on the other side. In FIG. 8, the PC 580-c is connected to the mail server 575b to find out which PC (580-e to 580-g) is reading a mail. For example, in a case where an ordinary mail is used, a mail server stores the data in the memory unit which can tell who was connected from what terminal in the last time. If the memory unit has no memorizing function, a memorizing function will be added, then it can be found that which terminal is connected by an inquiry from a terminal (PC) to the mail server. If a PC which is reading a mail is found out, there is a high probability that the person is using the terminal (PC), therefore, the PC is connected and the user is investigated. When the address of the PC is known, there is no need to connect the PC through the mail server, and it can be connected directly. When a terminal (PC) at the other end of the line is being used, it is connected as it is after confirmation.

Figure 9:
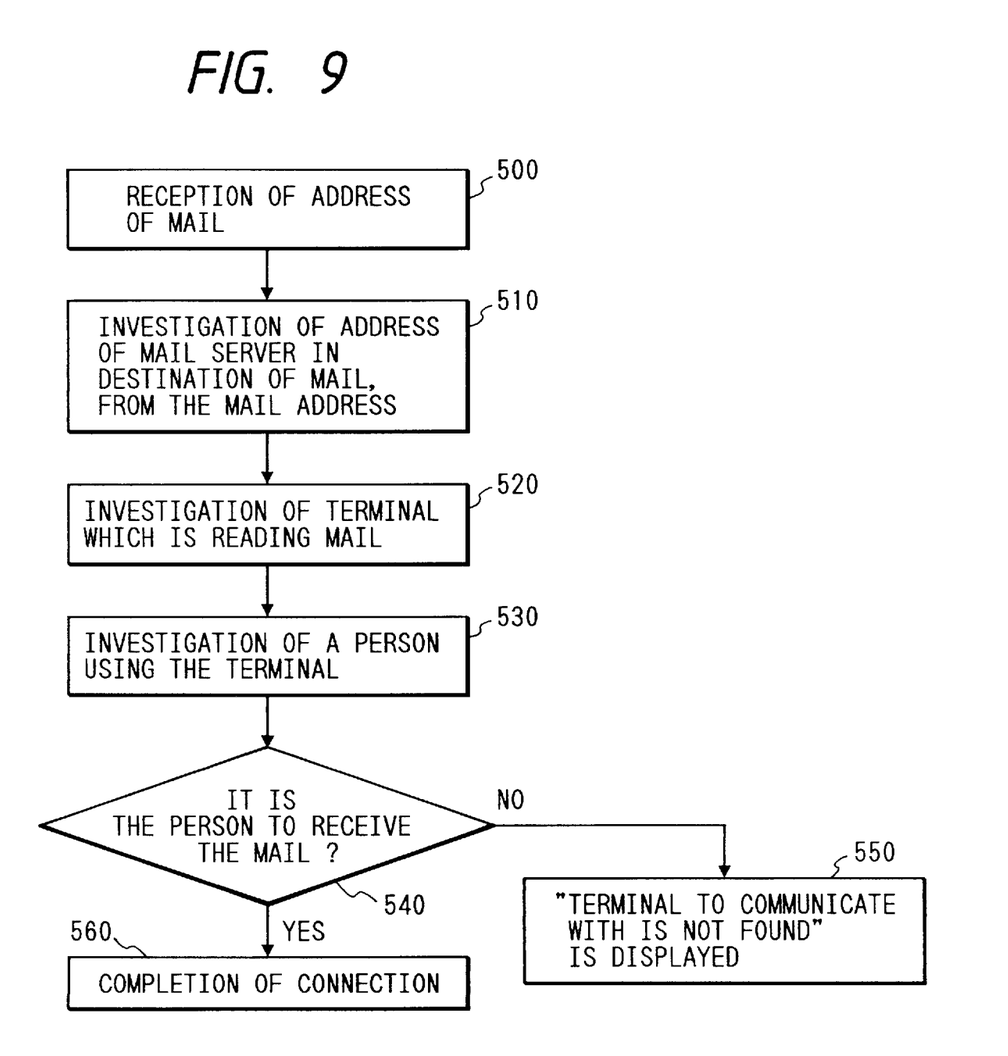
FIG. 9 is a flowchart showing the processing procedure for specifying a terminal which is being used by a person at the other end of the line from the mail address based on the constitution shown in FIG. 8.
Figure 10:
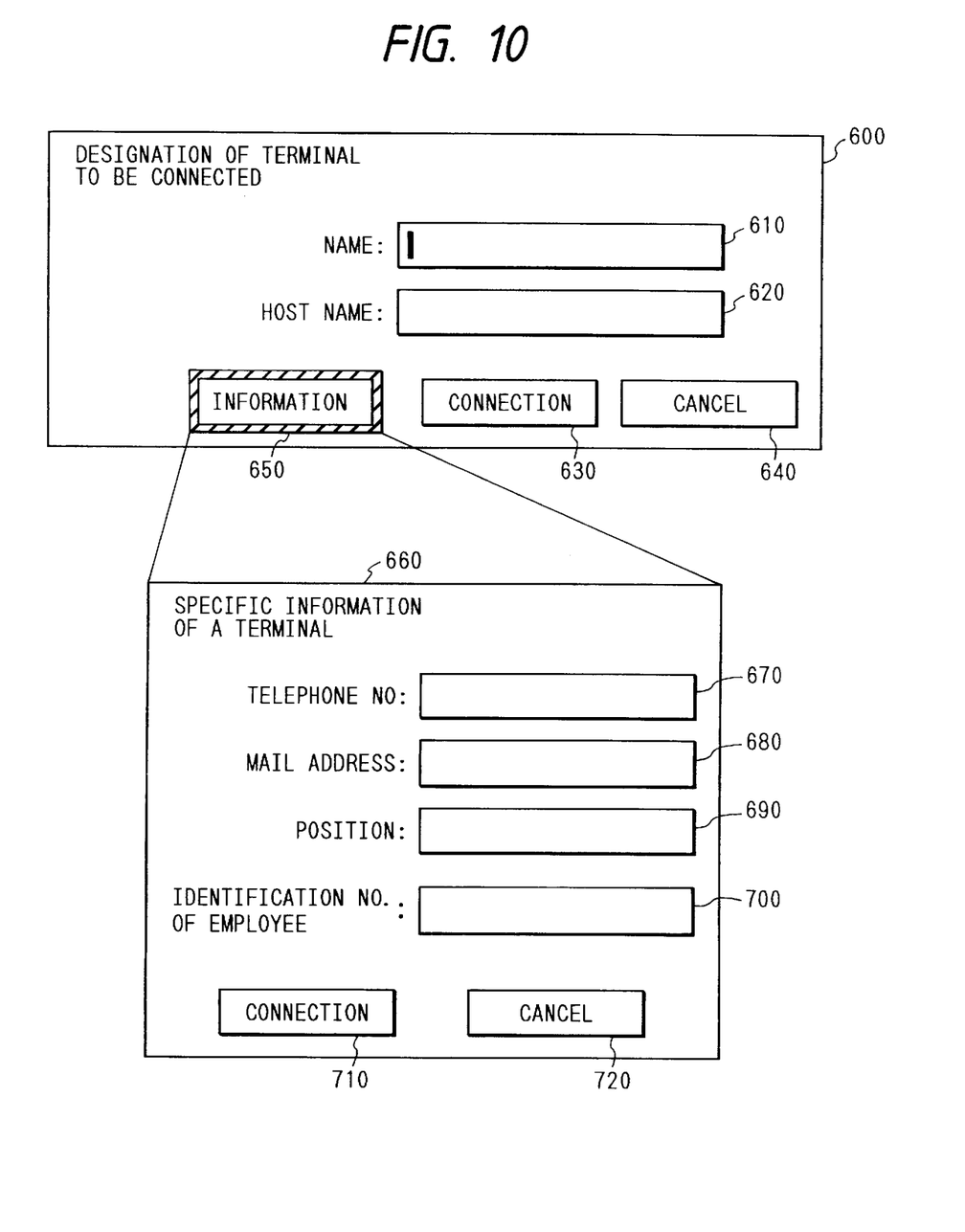
FIG. 10 is a diagram showing a user's interface to be used for the execution of the processing procedure shown in FIG. 9.
Figure 11:
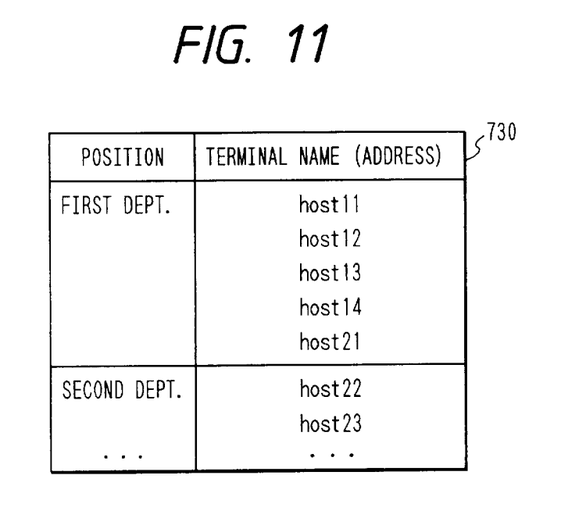
FIG. 11 is a diagram showing a history of usage data expressing the correspondence between positions and terminal names stored in each terminal (PC) or server beforehand.
Figure 12:
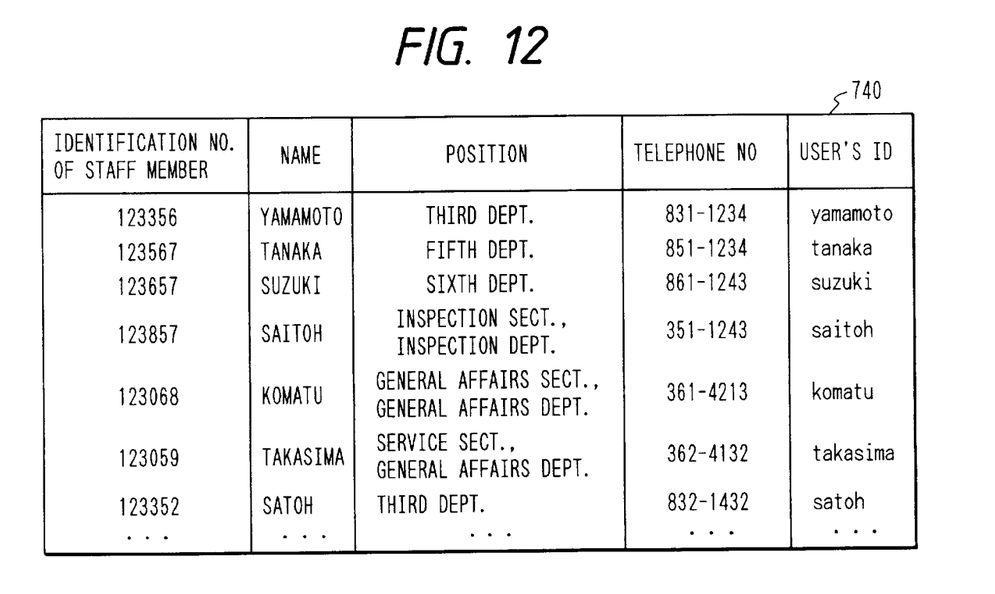
FIG. 12 is a diagram showing a history of usage data expressing a table of data of respective persons (employee numbers, names, positions, telephone numbers and users' ID's) stored in each terminal (PC) or server beforehand.

FIG. 9 is a flowchart showing the procedure of a process to conjecture and specify a terminal (PC, work station, etc.) having a high probability that the terminal is being used by a person with whom the information exchange is desired from the mail address based on the constitution shown in FIG. 8. When it is not possible to be connected to a terminal being used by a person to communicate with at the other end of the line directly and if it is needed to go through another terminal, the relaying terminal is considered to be capable of being connected.

At first, the mail address of a person to communicate with is input (step 500). From the mail address, the address of a mail server, the destination of the mail, is investigated (step 510). For example, when a mail address is hayashi@abc.efg.hi, the address of a mail server can be investigated by inquiring of DNS (Domain Name System) an address of a terminal having a name of abc.efg.hi.

The connection is made to the mail server and a terminal actually reading a mail is investigated (step 520). For example, in a case of an ordinary work station, it can be found that from which terminal it was logged in or which terminal read a mail in the last time by executing a command named "finger". It is also good to record the terminal name connected to the mail server. After this, the same process is performed as the user confirming process of a terminal explained in FIG. 6. It is investigated whether a person who is desired to be connected is using the terminal or not (step 530), and if the person is the one to receive the mail (step 540), the terminal is connected (step 560), and if not, a display telling that "A terminal to connect is not found." is displayed on the display 140 in a terminal which issued a connection request (step 550).

As described in the above, it is possible to perform information exchange or information communication with a person whose data are not known except his mail address by conjecturing and specifying a terminal used by the person from his mail address.

As explained in the above, according to the present invention, in a communication network system, even in a case where neither the name nor the address of a terminal to communicate with is known, it is possible to connect a terminal which wants to issue a connection request to another terminal to communicate with which is usable or in use through the communication network, thereby, there is an effect that information exchange or information communication can be performed between a terminal which wants to issue a connection request and a terminal to communicate with.

What is claimed is:

1. A communication network system in which a logical channel is connected between desired terminals being connected to said communication network to perform information exchange or information communication between said desired terminals, comprising:

a mail server for storing mail address translation data being connected to said communication network corresponding to a group of terminals composed of a plurality of information processing terminals connected to said communication network;

said information processing terminal comprising:

an input portion for inputting a mail address of a user to communicate with as the information to be a clue for finding a terminal having a large probability that the person desired to communicate with through said communication network is using the terminal; and a transmitting portion (a connection controller for a network and communication) for transmitting a mail address of said user to communicate with input from the input portion to said mail server; and said mail server comprising a connection controller for a network and communication for specifying a mail server being connected to a terminal which is desired to connect by said information processing terminal by virtue of the mail address transmitted from said transmitting portion based on said mail address translation data, selecting a terminal to communicate with having a large probability that a person having the user's name is using the terminal based on a selecting information stored in said specified mail server, transmitting a connection request to said selected terminal through said communication network, investigating if the person of the user's name can actually use the terminal or is using it, specifying a terminal being usable or in use, and connecting a logical channel to said specified terminal through said communication network.

2. An information processing terminal being connected to a communication network and connecting a logical channel between said desired terminals being connected to said communication network to perform information exchange or information communication between said terminals, comprising:

a memory unit for making and storing beforehand a selecting information being able to select a terminal to be connected having a large probability that a user to communicate with is using it, said selecting information being obtained from the corresponding relation between a user's name of a terminal which is desired to perform information communication through said communication network or information corresponding to said user's name, and specific information relating to said user's name, and said user's name or information corresponding to said user's name and specific information relating to said user's name;

an input portion for inputting at least either a user's name of a terminal which is desired to perform information communication through said communication network or information corresponding to said user's name, or specific information relating to said user's name; and a connection controller for a network and communication for retrieving, using either the user's name or the information corresponding to said user's name, or the specific information relating to the user's name input in the input portion, the other, based on the correspondence relation stored in said memory unit, selecting a terminal to be connected at the other end of a line having a probability that a person having the user's name is using it from the one party input in said input portion and the other party obtained by retrieval based on the selecting information stored in said memory unit, transmitting a connection request to the selected terminal through said communication network, investigating if the person of the user's name can actually use the terminal or is using it, specifying a terminal to be connected being usable or in use, and connecting a logical channel to said specified terminal through said communication network.

3. An information processing terminal according to claim 2, wherein in a case where a terminal to be connected to communicate with being in use is specified, when a terminal is in a waiting state where application software is activated by a user, a terminal activating daemon is investigated and specified.

4. A communication network system comprising:

a server being connected to said communication network; and an information processing terminal being connected to said communication network in which a logical channel is connected between desired terminals to perform information exchange or information communication between the terminals;

said server comprising a memory unit for making and storing beforehand a selecting information being able to select a terminal to be connected having a large probability that a user to communicate with is using it, said selecting information being obtained from a user's name of a terminal which is desired to perform information communication through said communication network or information corresponding to said user's name, and specific information relating to said user's name; and said information processing terminal comprising:

an input portion for inputting a user's name of a terminal which is desired to perform information communication through said communication network or information corresponding to said user's name, and specific information relating to said user's name; and a connection controller for a network and communication for selecting a terminal to be connected at the other end of a line having a large probability that a person having the user's name is using it by virtue of the user's name or information corresponding to said user's name, and specific information relating to said user's name input in said input portion based on the selecting information to be obtained through said communication network and stored in said memory unit in said server, transmitting a connection request to the selected terminal through said communication network, investigating if the person of the user's name can actually use the terminal or is using it, specifying a terminal to be connected being usable or in use, and connecting a logical channel to said specified terminal through said communication network.

5. A communication network system according to claim 4, wherein each of the memory units provided in said server comprises tables showing the correspondence between a user's name or information corresponding to said user's name, and the address of a terminal to be connected based on the history of usage of a person having said user's name, and the correspondence between telephone numbers, positions or places as specific information relating to said user's name, and the addresses of terminals existing in the vicinities of said telephone numbers, positions or places, as said selecting information to be stored.

6. A communication network system comprising:

a server being connected to said communication network; and an information processing terminal being connected to said communication network in which a logical channel is connected between desired terminals to perform information exchange or information communication between the terminals;

said server comprising:

a memory unit for making and storing beforehand a selecting information being able to select the address of a terminal to be connected having a large probability that a user to communicate with is using it, said selecting information being obtained from a user's name of a terminal which is desired to perform information communication through said communication network or information corresponding to said user's name, or specific information relating to said user's name; and said information processing terminal comprising:

an input portion for inputting a user's name of a terminal which is desired to perform information communication in connecting a logical channel through said communication network or information corresponding to said user's name, or specific information relating to said user's name; and a connection controller for a network and communication for selecting an address of a terminal to be connected at the other end of a line having a large probability that a person having the user's name is using it by virtue of the user's name or information corresponding to said user's name, or specific information relating to said user's name input in said input portion based on the selecting information to be obtained through said communication network and stored in said memory unit in said server, transmitting a connection request to the address of the selected terminal through said communication network, investigating if the person of the user's name can actually use the terminal or is using it, specifying a terminal to be connected being usable or in use, and connecting a logical channel to said specified terminal through said communication network.

7. A communication network system according to claim 6, wherein each of the memory units provided in said server comprises a table showing the correspondence between a user's name or information corresponding to said user's name and the address of a terminal to be connected based on the history of usage of a person having the user's name, as said selecting information to be stored.

8. A communication network system according to claim 6, wherein each of the memory units provided in said server comprises a table showing the correspondence between telephone numbers, positions or places as specific information relating to said user's name and the address of the terminal existing in the vicinities of said telephone numbers, positions or places, as said selecting information to be stored.

9. An information processing terminal being connected to a communication network and connecting a logical channel between said desired terminals being connected to said communication network to perform information exchange or information communication between said terminals, comprising:

a memory unit for storing beforehand a selecting information being able to select a terminal to be connected having a large probability that a user to communicate with is using it, said selecting information being obtained from a user's name of a terminal which is desired to perform information communication through said communication network or information corresponding to said user's name, and specific information relating to said user's name;

an input portion for inputting a user's name of a terminal which is desired to perform information communication through said communication network or information corresponding to said user's name, and specific information relating to said user's name; and a connection controller for a network and communication for selecting a terminal to be connected at the other end of a line having a large probability that a person having the user's name is using it by virtue of the user's name or information corresponding to said user's name, and specific information relating to said user's name input in said input portion based on the selecting information stored in said memory unit, transmitting a connection request to the selected terminal through said communication network, investigating if the person of the user's name can actually use the terminal or is using it, specifying a terminal to be connected being usable or in use, and connecting a logical channel to said specified terminal through said communication network.

10. An information processing terminal according to claim 9, wherein each of the memory units provided in a plurality of said desired terminals comprises tables showing the correspondence between a user's name or information corresponding to said user's name, and the address of a terminal to be connected based on the history of usage of a person having said user's name, and the correspondence between telephone numbers, positions or places as specific information relating to said user's name, and the addresses of terminals existing in the vicinities of said telephone numbers, positions or places, as said selecting information to be stored.

11. An information processing terminal communicating with a terminal via a communication networks, said information processing terminal connecting a logical channel between said desired terminals being connected to said communication network to perform information exchange or information communication between said terminals, comprising:

a memory unit for storing beforehand a selecting information being able to select the address of a terminal to be connected having a large probability that a user to communicate with is using it, said selecting information being obtained from a user's name of a terminal which is desired to perform information communication through said communication network or information corresponding to said user's name, or specific information relating to said user's name, such as a telephone number or a place and suggesting which terminal said user is using;

an input portion for inputting information corresponding to a user to communicate with in order to establish a logical channel selecting an address of a terminal to be connected at the other end of a line having a large probability that a person having the user's name is using it by virtue of the user's name or information corresponding to said user's name, or specific information relating to said user's name in said input portion based on the selecting information stored in said memory unit, transmitting a connection request to the address of the selected terminal through said communication network, investigating if the person of the user's name can actually use the terminal or is using it, specifying a terminal probably being used by said user based on said selecting information and said inputted information from said input portion, and connecting a logical channel to said specified terminal through said communication network.

12. An information processing terminal according to claim 11, wherein each of the memory units provided in a plurality of desired terminals comprises a table showing the correspondence between a user's name or information corresponding to said user's name and the address of a terminal to be connected based on the history of usage of a person having the user's name, as said selecting information to be stored.

13. An information processing terminal according to claim 11, wherein each of the memory units provided in a plurality of desired terminals comprises a table showing the correspondence between telephone numbers, positions or places as specific information relating to said user's name and the address of the terminal existing in the vicinities of said telephone numbers, positions or places, as said selecting information to be stored.

14. An information processing terminal being connected to a communication network and connecting a logical channel between said desired terminals being connected to said communication network to perform information exchange or information communication between said terminals, comprising:

an input portion for inputting a name of a user to communicate with corresponding to a terminal to be connected or information corresponding to said user's name in order to connect a logical channel between terminals selected out of a plurality of terminals connected to said communication network; and a connection controller for a network and communication for specifying a usable terminal at the other end of a line and connecting a logical channel to the terminal through said communication network based on the information input from said input portion.

15. An information processing terminal according to claim 14, wherein said input portion inputs specific information relating to a user's name in said terminal to be connected at the other end of a line, such as a telephone number or a place.

16. An information processing terminal according to claim 11, wherein said connection controller confirms which said user is using said terminal and establishes a logical channel with said terminal when said user uses said terminal.

* * * * *